United States Patent
Trofin et al.

(10) Patent No.: US 9,785,483 B2
(45) Date of Patent: *Oct. 10, 2017

(54) CONTROLLING RUNTIME ACCESS TO APPLICATION PROGRAM INTERFACES

(71) Applicant: Microsoft Technology Licensing, LLC, Redmond, WA (US)

(72) Inventors: Mircea Trofin, Sammamish, WA (US); Patrick Dussud, Redmond, WA (US); Rudi Martin, Snohomish, WA (US); John Lawrence Hamby, Seattle, WA (US); Michal Strehovsky, Redmond, WA (US); David Charles Wrighton, Redmond, WA (US); Atsushi Kanamori, Redmond, WA (US); Fadi M. Hanna, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,196

(22) Filed: Mar. 3, 2015

(65) Prior Publication Data

US 2015/0169387 A1  Jun. 18, 2015

Related U.S. Application Data

(63) Continuation of application No. 13/867,143, filed on Apr. 22, 2013, now Pat. No. 8,990,839.

(51) Int. Cl.
*G06F 9/54* (2006.01)
*G06F 9/44* (2006.01)

(52) U.S. Cl.
CPC ............. *G06F 9/541* (2013.01); *G06F 8/31* (2013.01); *G06F 8/315* (2013.01); *G06F 9/443* (2013.01); *G06F 9/4421* (2013.01)

(58) Field of Classification Search
None
See application file for complete search history.

(56) References Cited

U.S. PATENT DOCUMENTS

| 6,446,089 B1* | 9/2002 | Brodersen ......... G06F 17/30584 |
| 8,681,630 B1* | 3/2014 | Gibson ................. H04L 67/325 370/235 |
| 8,863,156 B1* | 10/2014 | Lepanto .............. G06F 9/44521 719/328 |
| 2007/0074033 A1* | 3/2007 | Adams .................. G06F 21/629 713/176 |
| 2007/0094260 A1* | 4/2007 | Murphy .................. G06F 21/51 |
| 2011/0252145 A1* | 10/2011 | Lampell ................. G06F 9/541 709/227 |

* cited by examiner

*Primary Examiner* — Tuan Dao
(74) *Attorney, Agent, or Firm* — Dodd Law Group, LLC; Michael B. Dodd (57) ABSTRACT

The present invention extends to methods, systems, and computer program products for controlling runtime access to application programming interfaces Embodiments of the invention allow library developers to more precisely and easily control which of their libraries' APIs can be called dynamically. Thus, their servicing and versioning burden can be more appropriately controlled. Further, application developers can control which such APIs to further exclude from dynamic calling scenarios, to minimize the runtime support overhead (e.g., preventing generation of metadata).

20 Claims, 6 Drawing Sheets

Fig. 1

```
                    ┌─────────────────────────────────────────┐
                    │  Accessing a set of application programming interfaces
                    │    (APIs) combined in a library, the set of application
                    │    programming interfaces (APIs) including one or more
                    │  public application programming interfaces (APIs) and one
                    │    or more non-public application programming interfaces
                    │                         (APIs)
                    │                          201
                    └─────────────────────────────────────────┘
                                         │
                                         ▼
                    ┌─────────────────────────────────────────┐
                    │  Identifying an application programming interface (API)
                    │  from among the set of application programming interfaces
                    │   (APIs) for which the default visibility provided to dynamic
                    │           access requests are to be altered
                    │                          202
                    └─────────────────────────────────────────┘
                                         │
                                         ▼
                    ┌─────────────────────────────────────────┐
                    │   Altering the default visibility into the application
                    │  programming interface (API) to an altered visibility by
                    │    applying an attribute to the application programming
                    │    interface (API), the attribute indicating to the runtime
                    │  environment at runtime that dynamic access requests are
                    │   to be provided the altered visibility into the application
                    │              programming interface (API)
                    │                          203
                    └─────────────────────────────────────────┘
```

CONTROLLING RUNTIME ACCESS TO APPLICATION PROGRAM INTERFACES

CROSS-REFERENCE TO RELATED APPLICATIONS

This application is a continuation of and claims the benefit of and priority to U.S. patent application Ser. No. 13/867,143, now U.S. Pat. No. 8,990,839, entitled "Controlling Runtime Access To Application Programming Interfaces", filed Apr. 22, 2013 by Mircea Trofin et. al., the entire contents of which are expressly incorporated by reference.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

During code development, software developers often use Application Programming Interfaces (APIs) to facilitate communication between software components. An API can include a specification for routines, data structures, object classes, and variables associated with the API. As such, one developer can use an API specification to determine how to call an API written by another developer.

Often, one software developer (a library developer) develops code having a number of related APIs that are grouped into a library offering specified functionality. The software developer can make parts of the functionality available to other programs by exposing corresponding APIs within the library as public APIs. Thus, another developer (an application developer) can access the available parts of functionality from within their code through calls to the public APIs. The software developer can also maintain other parts of the functionality as private. The private functionality can be used internally between APIs within the library or to access other private APIs in other libraries. APIs providing the private functionality are not directly exposed to other programs.

However, many runtime environments permit code to dynamically call any API in a third party library (e.g., using reflection to access metadata). As such, an application program or library can identify and call private APIs within another library. When a software developer maintains an API is private, the software developer does not expect the API to be externally called. Unfortunately, servicing or versioning changes to internal implementation details of such libraries, such as, for example, renames or removals of private methods, have the potential of causing breaking changes in applications using these libraries.

In addition, runtime support for dynamic calls carries a size and working set overhead (e.g., metadata). The size and working set overhead is maintained for APIs (private or public) whether or not the APIs are actually called dynamically. Maintaining size and working set overhead for uncalled APIs unnecessarily consumes computing resources.

BRIEF SUMMARY

The present invention extends to methods, systems, and computer program products for controlling runtime access to application programming interfaces. Embodiments of the invention include controlling runtime access to an application programming interfaces (API). A runtime environment provides dynamic access requests (e.g., through reflection or other dynamic calling techniques) with a default visibility into APIs based on API type. For example, the default visibility into non-public APIs may prevent dynamic access.

A set of APIs combined in a library is accessed. The set of APIs include one or more public APIs and one or more non-public APIs. An API is identified from among the set of APIs for which the default visibility provided to dynamic access requests is to be altered.

The default visibility into the API is altered by applying an attribute to the API. The attribute indicates to the runtime environment at runtime that dynamic access requests are to be provided the altered visibility into the API. Altering visibility can include permitting dynamic access to a non-public API where by default dynamic access is not permitted.

Other embodiments include reducing the default visibility into an accessible API. Application code for an application is accessed. The application code refers to one or more accessible APIs combined in a library. An accessible API referred to within the application code is identified. The accessible API is selected from among the one or more accessible APIs.

It is determined that the accessible API is not to be dynamically accessed at runtime. An attribute is applied to the accessible API to reduce the default visibility into the accessible API. The attribute indicates to a runtime environment at runtime that dynamic access requests (e.g., through reflection or other dynamic calling techniques) are to be provided with reduced visibility into the accessible API. Reducing visibility into an API can correspondingly reduce metadata generation. In some embodiments, reducing visibility into an API includes preventing dynamic access to the API.

Further embodiments include providing a consumer with specified visibility into an API. Executable code is executed in a runtime environment. The executable code is derived from application code. During execution of the executable code, a dynamic call is received from a consumer to execute a portion of the executable code. The portion of the executable code is derived from a portion of the application code that refers to an API within a library. A runtime default visibility into the API is accessed based on the type of the API.

Any attributes applied to the API are accessed. Attributes applied to the API can be indicative of a desire by the author of API to alter the runtime default visibility into the API. Any attributes applied to the portion of the application code are accessed. Attributes applied to the portion of the application code can be indicative of a desire by the author of the application code to provide less visibility into the API than indicated by the runtime default visibility as altered by any attributes applied to the API.

A calculated visibility into the API is determined based on one or more of: the runtime default visibility into the API, any attributes applied to the API, and any attributes applied to the portion of the application code that refers to the API. The dynamic call is provided with the calculated visibility into the API.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for controlling runtime access to application programming interfaces. Embodiments of the invention include controlling runtime access to an application programming interfaces (API). A runtime environment provides dynamic access requests (e.g., through reflection or other dynamic calling techniques) with a default visibility into APIs based on API type. For example, the default visibility into non-public APIs may prevent dynamic access.

A set of APIs combined in a library is accessed. The set of APIs include one or more public APIs and one or more non-public APIs. An API is identified from among the set of APIs for which the default visibility provided to dynamic access requests is to be altered.

The default visibility into the API is altered by applying an attribute to the API. The attribute indicates to the runtime environment at runtime that dynamic access requests are to be provided the altered visibility into the API. Altering visibility can include permitting dynamic access to a non-public API where by default dynamic access is not permitted.

Other embodiments include reducing the default visibility into an accessible API. Application code for an application is accessed. The application code refers to one or more accessible APIs combined in a library. An accessible API referred to within the application code is identified. The accessible API is selected from among the plurality of accessible APIs.

It is determined that the accessible API is not to be dynamically accessed at runtime. An attribute is applied to the accessible API to reduce the default visibility into the accessible API. The attribute indicates to a runtime environment at runtime that dynamic access requests (e.g., through reflection or other dynamic calling techniques) are to be provided with reduced visibility into the accessible API. Reducing visibility into an API can correspondingly reduce metadata generation. In some embodiments, reducing visibility into an API includes preventing dynamic access to the API.

Further embodiments include providing a consumer with specified visibility into an API. Executable code is executed in a runtime environment. The executable code is derived from application code. During execution of the executable code, a dynamic call is received from a consumer to execute a portion of the executable code. The portion of the executable code is derived from a portion of the application code that refers to an API within a library. A runtime default visibility into the API is accessed based on the type of the API.

Any attributes applied to the API are accessed. Attributes applied to the API can be indicative of a desire by the author of API to alter the runtime default visibility into the API. Any attributes applied to the portion of the application code are accessed. Attributes applied to the portion of the application code can be indicative of a desire by the author of the application code to provide less visibility into the API than indicated by the runtime default visibility as altered by any attributes applied to the API.

A calculated visibility into the API is determined based on one or more of: the runtime default visibility into the API, any attributes applied to the API, and any attributes applied to the portion of the application code that refers to the API. The dynamic call is provided with the calculated visibility into the API.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Embodiments of the invention allow library developers to more precisely and easily control which of their libraries' APIs can be called dynamically. Thus, their servicing and versioning burden can be more appropriately controlled. Further, application developers can control which such APIs to further exclude from dynamic calling scenarios, to minimize the runtime support overhead.

Figure 1:
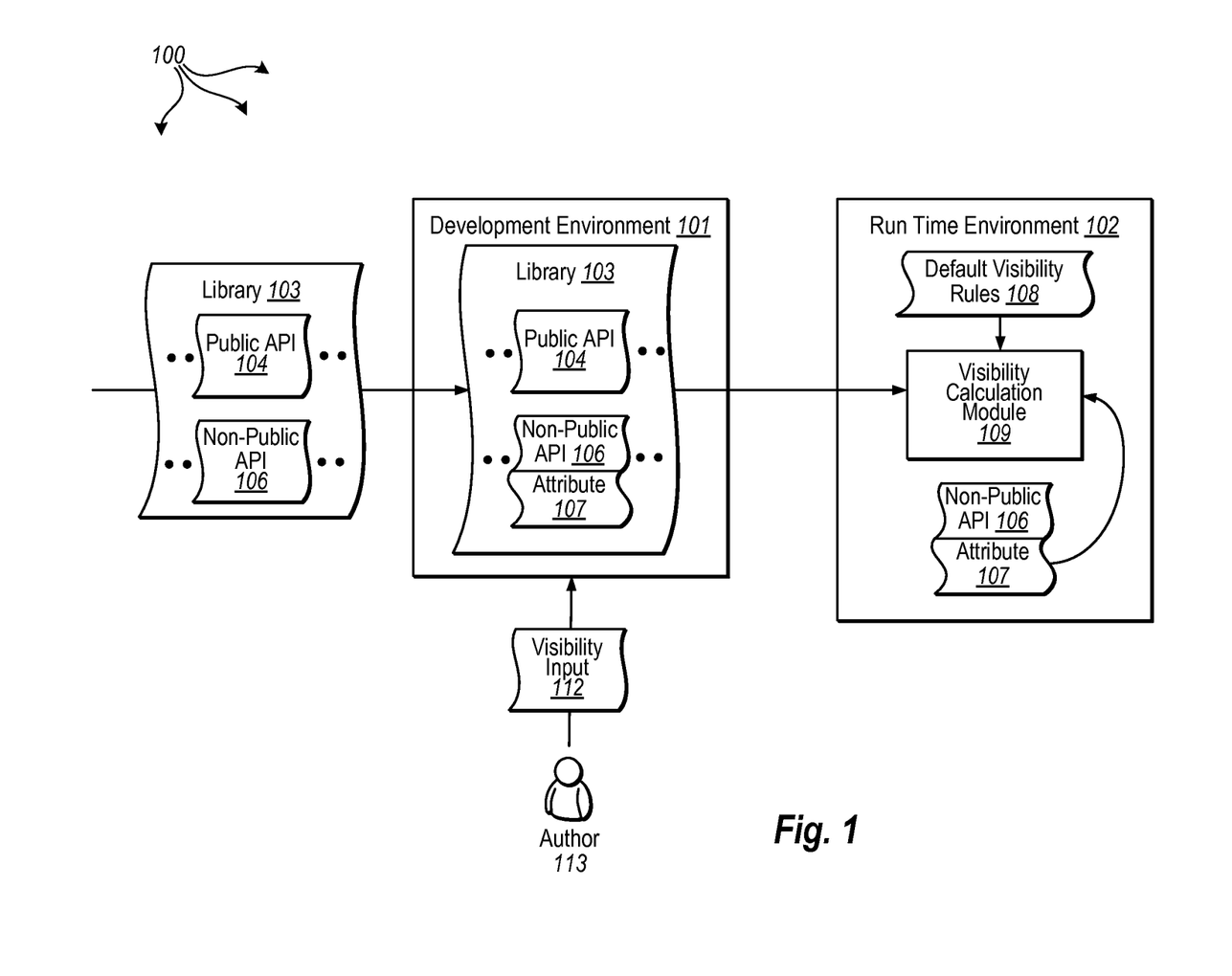
FIG. 1 illustrates an example computer architecture that facilitates controlling runtime access to an application programming interface.

FIG. 1 illustrates an example computer architecture 100 that facilitates controlling access to an application programming interface (API). Referring to FIG. 1, computer architecture 100 includes development environment 101 and runtime environment 102. development environment 101 and runtime environment 102 can be connected to one another over (or be part of) a network, such as, for example, a system bus, a Local Area Network ("LAN"), a Wide Area Network ("WAN"), and even the Internet. Accordingly, development environment 101 and runtime environment 102 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Development environment 101 can be a software application that provides facilities for software development, including but not limited to: a source code editor, build automation, a debugger, a version control system, a class browser, an object inspector, a class hierarchy diagram, etc. In some embodiments, development environment 101 includes or is included in an Integrated Development Environment (IDE). A library developer can use development environment 101 to apply an attribute to an API to change the visibility of the API to dynamic access requests.

Runtime environment 102 can be a software application that provides facilities for software execution. Runtime environment 102 can include a compiler (e.g., a just-in-time (JIT) compiler) and/or an interpreter for executing code developed in software development environment 101. In some embodiments, runtime environment 102 includes or is included in an Integrated Development Environment (IDE). Runtime environment 102 can include mechanisms (e.g., reflection) for dynamically requesting access to an API.

Development environment 101 and execution environment 102 can be integrated into the same environment or can be resident in separate environments.

Runtime environment 102 includes visibility calculation module 109. Visibility calculation module is configured to calculate the visibility into an API based on API type (e.g., internal, private, public, etc.) and applied attributes. Default visibility rules 108 can define a default visibility (e.g., permit dynamic access or remove dynamic access) for each API type. Applied attributes can be used to alter or override a default visibility. As such, applied attributes give a library developer more precise control over how individual APIs can be accessed dynamically.

In some embodiments, default visibility rules 108 define that dynamic access is removed for APIs indicated as private or internal. A library developer can use development environment 101 to apply an attribute to the private or internal API. The applied attribute can indicate that dynamic access is to be permitted for the private or internal API. Upon receiving a dynamic call to the private or internal API, visibility calculation module 109 can determine that the applied attribute overrides the default visibility (of removed dynamic access) for the private or internal API. As such, the dynamic call is permitted access to the private or internal API.

Figure 2:
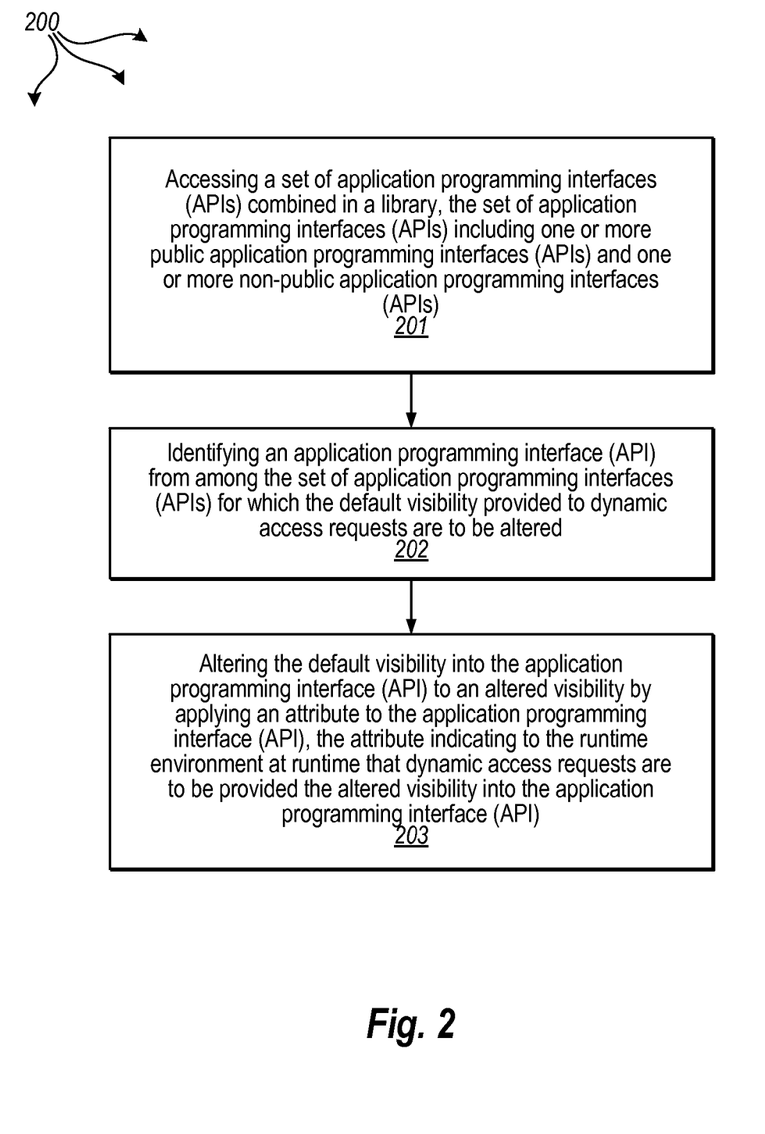
FIG. 2 illustrates a flow chart of an example method for controlling runtime access to an application programming interface.

FIG. 2 illustrates a flow chart of an example method 200 for controlling access to an application programming interface (API). Method 200 will be described with respect to the components and data of computer architecture 100.

Method 200 includes accessing a set of application programming interfaces (APIs) combined in a library, the set of application programming interfaces (APIs) including one or more public application programming interfaces (APIs) and one or more non-public application programming interfaces (APIs) (201). For example, development environment 101 can access library 103. Library 103 includes one or more public APIs including public API 104. Library 103 includes one or more non-public (e.g., private or internal) APIs including non-public API 106

Method 200 includes identifying an application programming interface (API) from among the set of application programming interfaces (APIs) for which the default visibility provided to dynamic access requests is to be altered (202). For example, development environment 101 (possibly in response to author input) can identify that the default visibility for dynamic access requests (e.g., using reflection or other dynamic calling techniques) into non-public API 106 is to be altered.

Method 200 includes altering the default visibility into the application programming interface (API) to an altered visibility by applying an attribute to the application programming interface (API), the attribute indicating to the runtime environment at runtime that dynamic access requests are to be provided the altered visibility into the application programming interface (API) (203). For example, author 113 can enter visibility input 112 at development environment 101. In response to visibility input 112, development environment 101 can apply attribute 107 to non-public API 106. Attribute 107 can indicate to runtime environment 102 that the default visibility for non-public APIs defined in default visibility rules 108 is to be altered for non-public API 106.

Subsequently, library 103 can be compiled along with other source code into executable code 111. During execution of executable code 111, visibility calculation module 109 can consider both default visibility rules 108 and attribute 107 when calculating visibility into non-public API 106. In some embodiments, attribute 107 indicates the dynamic access to non-public API 106 is allowed even though default visibility rules 108 indicate that dynamic access to non-public APIs is to be prevented.

Figure 3:
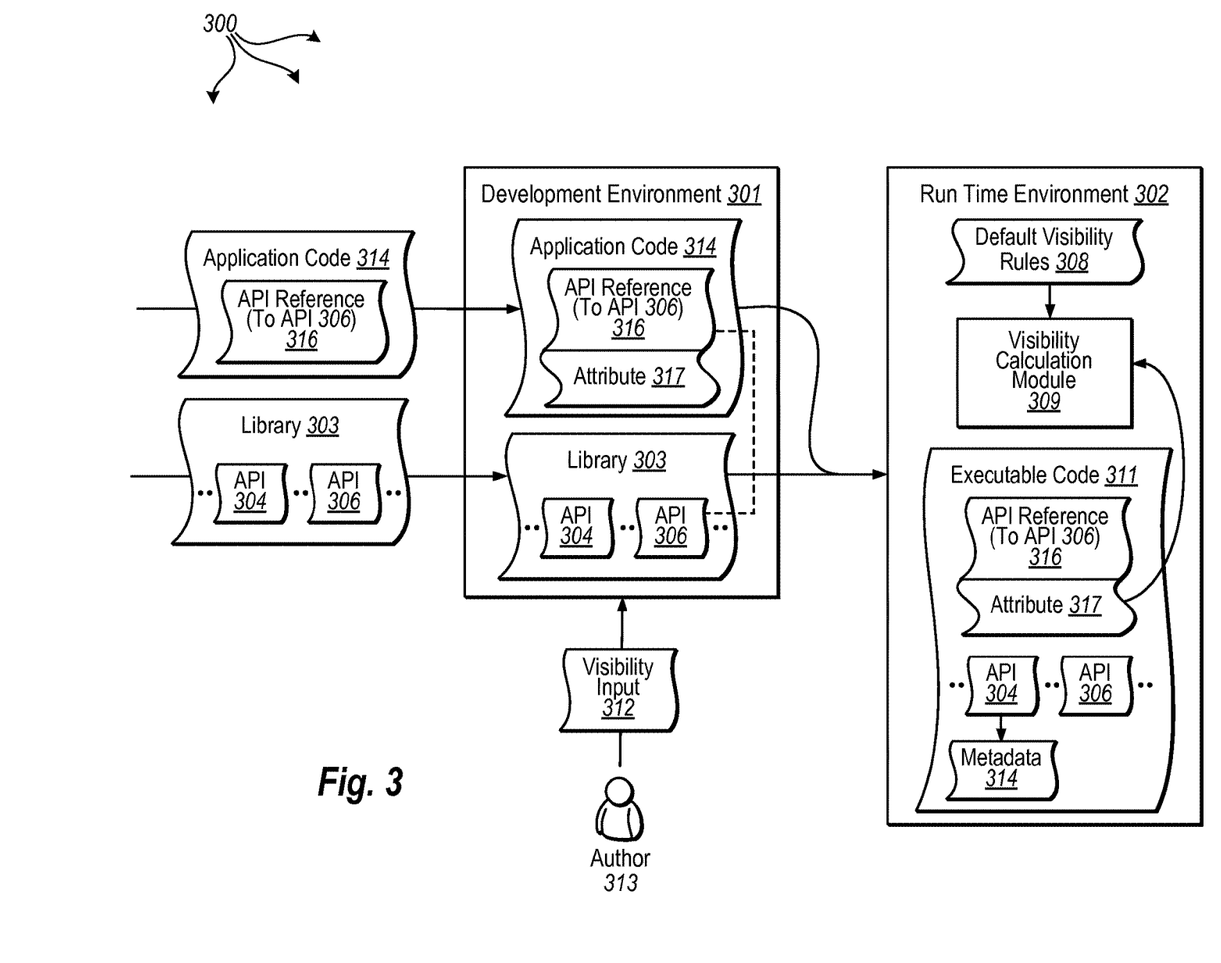
FIG. 3 illustrates an example computer architecture that facilitates reducing the default visibility into an accessible application programming interface.

FIG. 3 illustrates an example computer architecture 100 that facilitates reducing the default visibility into an accessible application programming interface (API). Referring to FIG. 3, computer architecture 300 includes development environment 301 and runtime environment 302. development environment 301 and runtime environment 302 can be connected to one another over (or be part of) a network, such as, for example, a system bus, a Local Area Network ("LAN"), a Wide Area Network ("WAN"), and even the Internet. Accordingly, development environment 301 and runtime environment 302 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Development environment 301 can be a software application that provides facilities for software development, including but not limited to: a source code editor, build automation, a debugger, a version control system, a class browser, an object inspector, a class hierarchy diagram, etc. In some embodiments, development environment 301 includes or is included in an Integrated Development Environment (IDE). An application developer can use development environment 301 to apply an attribute to code referencing an accessible API (e.g., included in a third party library). Attributes applied to code referencing an accessible API can be used to reduce default visibility into the accessible API.

Runtime environment 302 can be a software application that provides facilities for software execution. Runtime environment can include a compiler (e.g., a just-in-time (JIT) compiler) and/or an interpreter for executing code developed in software development environment 301. In some embodiments, runtime environment 302 includes or is included in an Integrated Development Environment (IDE). Runtime environment 302 can include mechanisms (e.g., reflection) for dynamically requesting access to an API.

Development environment 301 and execution environment 302 can be integrated into the same environment or can be resident in separate environments.

Runtime environment 302 includes visibility calculation module 309. Visibility calculation module 309 is configured to calculate the visibility into an accessible API (e.g., public API or non-public API attributed to permit dynamic access) based on attributes applied to code referencing the accessible API. Default visibility rules 308 can permit dynamic access to accessible APIs. As such, applied attributes give an application developer a mechanism to exclude otherwise accessible APIs (e.g., included in a third party library) from dynamic access. Excluding an otherwise accessible API from dynamic access minimizes runtime support overhead (e.g., metadata generation) and thereby conserves resources.

Figure 4:
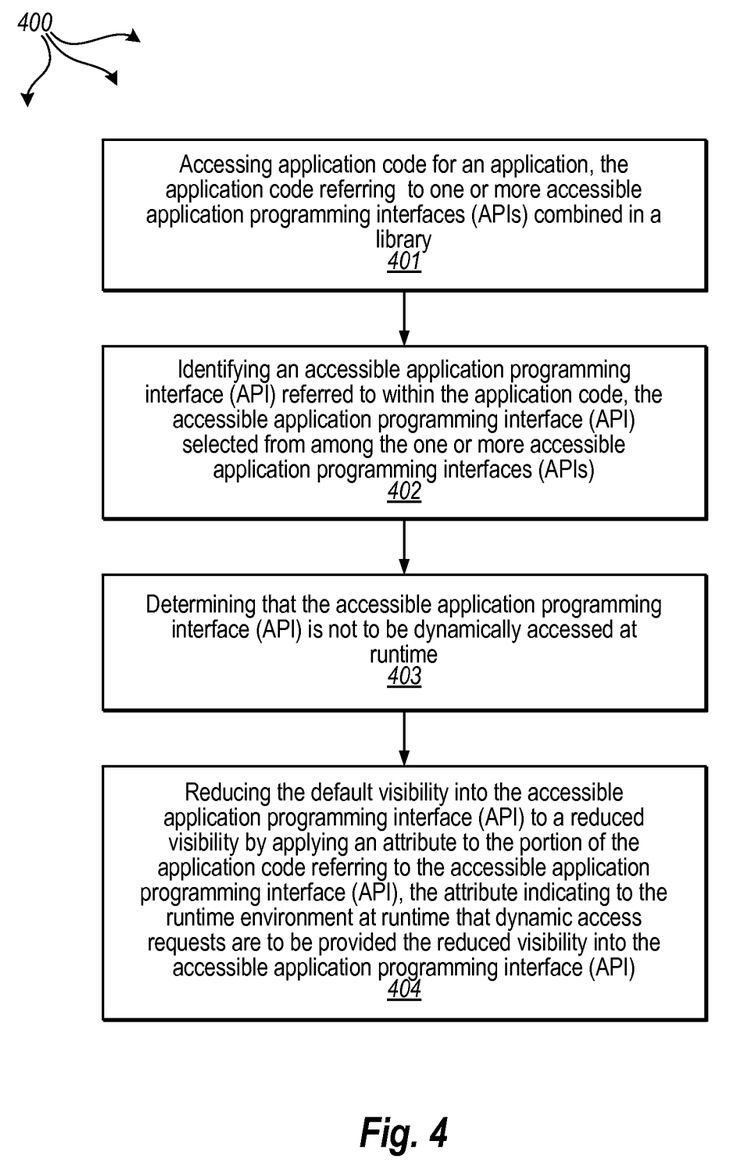
FIG. 4 illustrates a flow chart of an example method for reducing the default visibility into an accessible application programming interface.

FIG. 4 illustrates a flow chart of an example method 400 for reducing the default visibility into an accessible application programming interface (API). Method 400 will be described with respect to the components and data of computer architecture 300.

Method 400 includes accessing application code for an application, the application code referring to one or more accessible application programming interfaces (APIs) combined in a library (401). For example, development environment 301 can access application code 314. Development environment 310 can also access library 30. Application code 314 can refer to one or more APIs, such as, for example, APIs 304 and 306, included in library 303.

Method 400 includes identifying an accessible application programming interface (API) referred to within the application code, the accessible application programming interface (API) selected from among the one or more accessible application programming interfaces (APIs) (402). For example, development environment 301 can identify API 306 referred to by API reference 316.

Method 400 includes determining that the accessible application programming interface (API) is not to be dynamically accessed at runtime (403). For example, development environment 301 (possibly in response to author input) can determine that dynamic access to API 306 is to be prevented.

Method 400 includes reducing the default visibility into the accessible application programming interface (API) to a reduced visibility by applying an attribute to the portion of the application code referring to the accessible application programming interface (API), the attribute indicating to the runtime environment at runtime that dynamic access requests are to be provided the reduced visibility into the accessible application programming interface (API) (404). For example, author 313 can enter visibility input 312 at development environment 301. In response to visibility input 312, development environment 301 can apply attribute 317 to API reference 316 (a reference to API 306). Attribute 317 can indicate to runtime environment 302 that the default visibility for API 306 is to is to be reduced.

Subsequently, application code 314 and library 303 can be compiled along (possibly with other source code) into executable code 311. During execution of executable code 311, visibility calculation module 309 can consider both default visibility rules 308 and attribute 317 when calculating visibility into API 306. In some embodiments, attribute 317 indicates the dynamic access to API 306 is prevented even though default visibility rules 308 indicate that dynamic access to accessible APIs is to be allowed.

Limited visibility into an API can include not generating metadata for the API. For example, as depicted in computer architecture 300, metadata is not generated for API 306. On the other hand, metadata 319 can be generated for API 304 (another accessible API referenced form application code 314).

Figure 5:
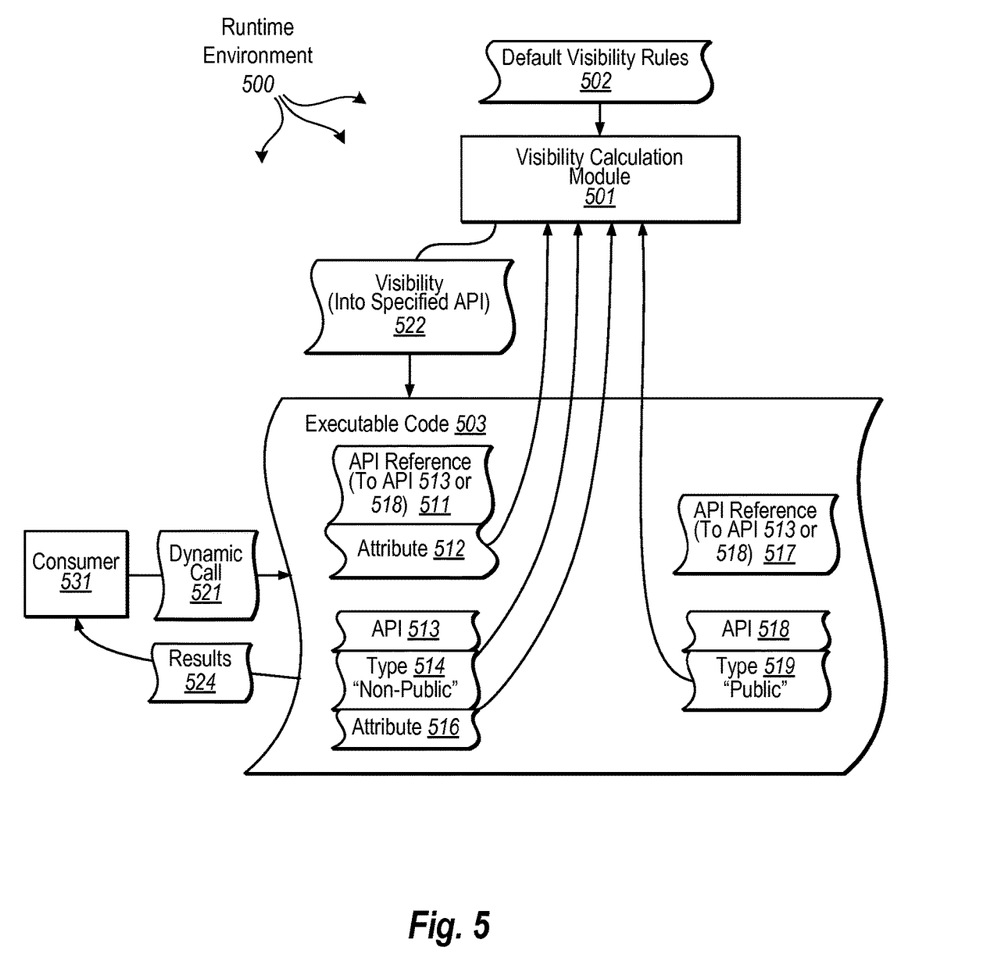
FIG. 5 illustrates an example computer architecture that facilitates providing a consumer with specified visibility into an application programming interface.

FIG. 5 illustrates an example runtime environment 500 that facilitates providing a consumer with specified visibility into an application programming interface (API). Referring to FIG. 5, runtime environment 500 includes visibility calculation module 501 and consumer 531. Visibility calculation module 501 and consumer 531 can be connected to one another over (or be part of) a network, such as, for example, a system bus, a Local Area Network ("LAN"), a Wide Area Network ("WAN"), and even the Internet. Accordingly, visibility calculation module 501 and consumer 531 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Runtime environment 500 can be a software application that provides facilities for software execution. Runtime environment can include a compiler (e.g., a just-in-time (JIT) compiler) and/or an interpreter for executing code developed in software development environment 500. In some embodiments, runtime environment 500 includes or is included in an Integrated Development Environment (IDE). Runtime environment 500 can include mechanisms (e.g., reflection) for dynamically requesting access to an API.

Runtime environment 500 includes visibility calculation module 501. Visibility calculation module 501 is configured to calculate the visibility into an each of a plurality of APIs grouped together in a library. Visibility can be calculated for an API based on an API type (e.g., internal, private, public), attributes applied (e.g., a library author) to the API, and attributes applied to application that references the API. Applied attributes can be used to alter, override, reduce, etc. a default visibility.

In some embodiments, default visibility rules 502 define that dynamic access is removed for non-public (e.g., private or internal) APIs and that dynamic access is permitted for public APIs. However, the author of a non-public API (e.g., a library author) can apply an attribute to the non-public API to override the default visibility and permit dynamic access to the non-public API. Likewise, the author of a public API (e.g., a library author) can apply an attribute to the public API to override the default visibility and deny dynamic access to the public API. Other default visibility rules are also possible.

For any dynamically accessible APIs (whether dynamically accessible by default or dynamically accessible by an applied attribute), a third party author (e.g., an application author) can apply an attribute to code referencing the dynamically accessible API to remove dynamic access from the API. Thus, an application author can minimize runtime support overhead (e.g., metadata generation) and thereby conserves resources.

Figure 6:
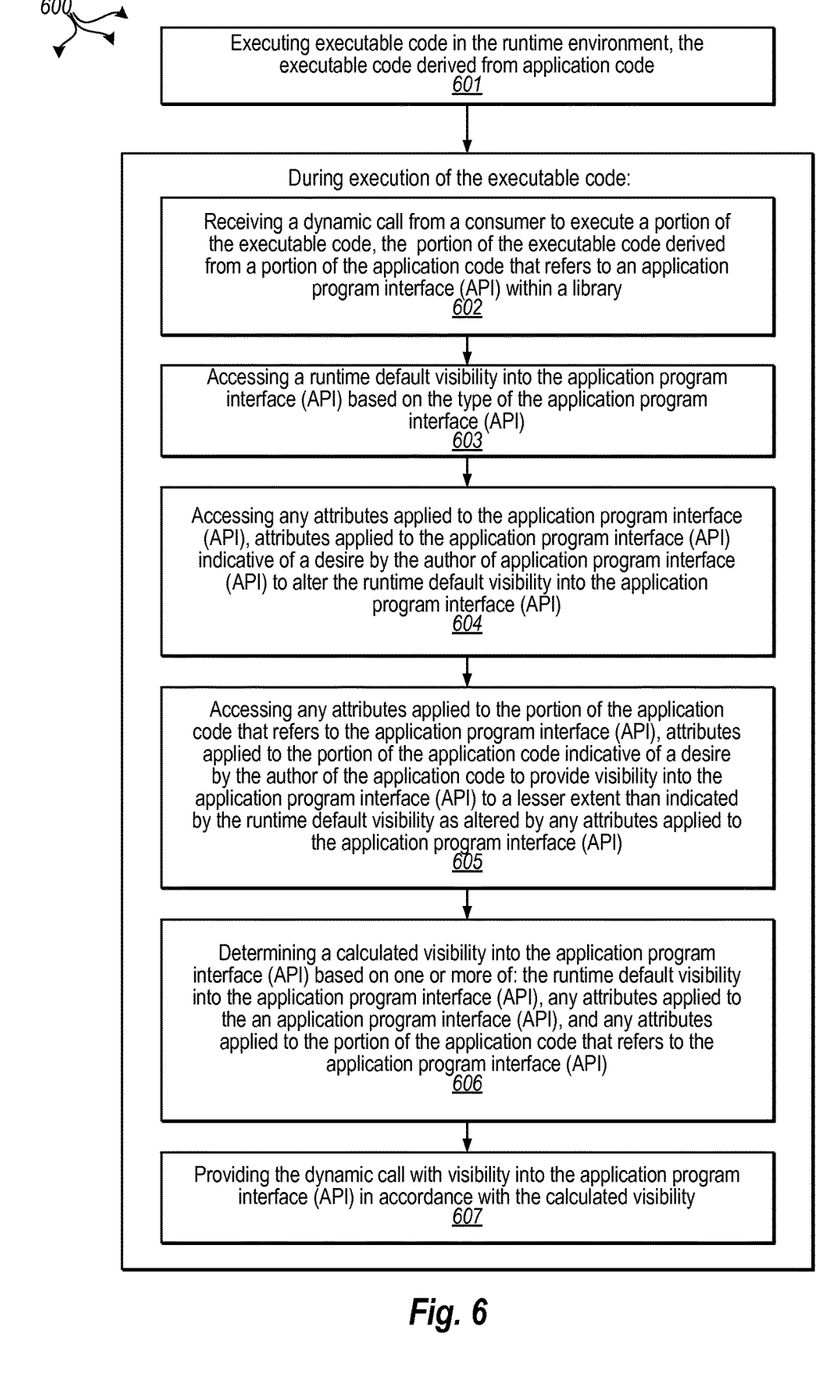
FIG. 6 illustrates a flow chart of an example method for providing a consumer with specified visibility into an application programming interface.

FIG. 6 illustrates a flow chart of an example method 600 for providing a consumer with specified visibility into an application programming interface (API). Method 600 will be described with respect to the components and data of runtime environment 500.

Method 600 includes executing executable code in the runtime environment, the executable code derived from application code (601). For example, executable code can be executed in runtime environment 500. Executable code 503 can be derived from application code that includes references to APIs contained in a library. For example, API references 511 and 517 can reference APIs contained in a library. The APIs contained in the library can include APIs 513 and 518

Method 600 includes during execution of the executable code, method 600 includes receiving a dynamic call from a consumer to execute a portion of the executable code, the portion of the executable code derived from a portion of the application code that refers to an application program interface (API) within a library (602). For example, dynamic call 521 can be received from consumer 531. Dynamic call 521 can be a call to execute a portion of executable code 503.

In one embodiment, dynamic call 521 is a call to execute executable code that includes API reference 511. API reference 511 can reference either API 513 or API 518. In another embodiment, dynamic call 521 is a call to execute executable code that includes API reference 517. API reference 517 can reference either API 513 or API 518.

Method 600 includes accessing a runtime default visibility into the application program interface (API) based on the type of the application program interface (API) (603). As indicated by type 514, API 513 is a non-public API. Thus, when an API reference references API 513, a runtime default visibility for (e.g., preventing dynamic access to) non-public APIs can be accessed from default visibility rules 502 (for API 513). As indicated by type 519, API 518 is a public API. Thus, when an API reference references API 518, a runtime default visibility for (e.g., allowing dynamic access to) public APIs can be accessed from default visibility rules 502 (for API 518).

Method 600 includes accessing any attributes applied to the application program interface (API), attributes applied to the application program interface (API) indicative of a desire by the author of application program interface (API) to alter the runtime default visibility into the application program interface (API) (604). For example, when an API reference references API 513, attribute 516 can be accessed. Attribute 516 can indicate a desire by the library author to alter the runtime default visibility (as defined in default visibility rules 502) into API 513. For example, by default, dynamic access to non-public APIs can be prevented. However, attribute 513 can indicate that dynamic access to API 513 is to be permitted.

Method 600 includes accessing any attributes applied to the portion of the application code that refers to the application program interface (API), attributes applied to the portion of the application code indicative of a desire by the author of the application code to provide visibility into the application program interface (API) to a lesser extent than indicated by the runtime default visibility as altered by any attributes applied to the application program interface (API) (605). For example, when dynamic call 521 is a call to execute executable code that includes API reference 511, attribute 512 can be accessed. Attribute 512 can indicate a desire by an application author to reduce visibility into a reference API (e.g., API 513 or API 518). For example, attribute 512 can indicate that dynamic access to the references API (e.g., API 513 or API 518) is to be prevented. As such, even if the library author otherwise permits dynamic access to an API, the application developer can apply attribute 512 to prevent dynamic access to the API.

Method 600 includes determining a calculated visibility into the application program interface (API) based on one or more of: the runtime default visibility into the application program interface (API), any attributes applied to the an application program interface (API), and any attributes applied to the portion of the application code that refers to the application program interface (API) (606). Thus, visibility calculation module 501 can determine a calculated visibility 522 into an API based on a default visibility for the API's type (as defined in default visibility rules 502), any attributes applied to the API, and any attributes applied to an API reference that references the API.

Method 600 includes providing the dynamic call with visibility into the application program interface (API) in accordance with the calculated visibility (607). For example, consumer 531 can be provided with visibility 522 into a dynamically called API in executable code 503. Results 524 of dynamic call 521 can also be returned to consumer 531. Results 524 may indicate that the dynamic access to the dynamically called API is not permitted.

Within executable code 503 various different combinations of referring code and APIs are possible. In one embodiment, dynamical call 521 uses API reference 511 to call API 513. In this embodiment, visibility 522 is determined from a default visibility for API type 514 (e.g., as defined in default visibility rules 502), attribute 512, and attribute 516. In another embodiment, dynamical call 521 uses API reference 511 to call API 518. In this embodiment, visibility 522 is determined from a default visibility for API type 519 (e.g., as defined in default visibility rules 502) and attribute 512.

In a further embodiment, dynamical call 521 uses API reference 517 to call API 513. In this further embodiment, visibility 522 is determined from a default visibility for API type 514 (e.g., as defined in default visibility rules 502) and attribute 516. In an additional embodiment, dynamical call 521 uses API reference 517 to call API 518. In this further embodiment, visibility 522 is determined from a default visibility for API type 519 (e.g., as defined in default visibility rules 502).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for use at a computer system, the computer system including a processor, the method for altering visibility into programming interface, the method comprising the processor:
   determining that a default visibility into the programming interface is to be altered, the default visibility defined by a programming interface type of the programming interface, the default visibility defining what other software components can access the programming interface at runtime; and
   overriding the default visibility into the programming interface by attaching an additional attribute to the programming interface, the additional attribute indicating to a visibility calculation module that runtime dynamic access requests to utilize functionality of the programming interface are to be evaluated using the additional attribute attached to the programming interface.

2. The method of claim 1, wherein determining that a default visibility into the programming interface is to be altered comprises determining that a default visibility into an application programming interface (API) is to be altered; and
   wherein overriding the default visibility into the programming interface by attaching an additional attribute to the programming interface comprises overriding the default visibility into the application programming interface (API) by attaching an additional attribute to the application programming interface (API).

3. The method of claim 2, wherein identifying an application programming interface (API) comprises identifying a non-public application programming interface (API), the default visibility for the non-public application programming interface (API) preventing dynamic access to the non-public application programming interface (API).

4. The method of claim 3, wherein overriding the default visibility into the application programming interface (API) comprises applying an attribute to the non-public application programming interface (API), the attribute altering the default visibility for the non-public application programming interface (API) to allow dynamic access to the non-public application programming interface (API).

5. The method of claim 2, wherein identifying an application programming interface (API) comprises identifying a public application programming interface (API), the default visibility for the public application programming interface (API) allowing dynamic access to the public application programming interface (API).

6. The method of claim 5, wherein overriding the default visibility of the application programming interface (API) comprises applying at attribute to the public application programming interface (API), the attribute altering the default visibility for the public application programming interface (API) to prevent dynamic access to the public application programming interface (API).

7. The method of claim 2, further comprising, prior to overriding the default visibility, receiving visibility input from an author of the application programming interface (API), the visibility input indicating the additional attribute.

8. The method of claim 1, wherein overriding the default visibility by attaching an additional attribute to the programming interface comprises increasing visibility into the programming interface.

9. A computer program product for use at a computer system, the computer program product for implementing a method for altering visibility into programming interface, the computer program product comprising one or more computer storage devices having stored thereon computer-executable instructions that, when executed a processor, cause the computer system to perform the method including the following:
determine that a default visibility into the programming interface is to be altered, the default visibility defined by a programming interface type of the programming interface, the default visibility defining what other software components can access the programming interface at runtime; and
override the default visibility into the programming interface by attaching an additional attribute to the programming interface, the additional attribute indicating to a visibility calculation module that runtime dynamic access requests to utilize functionality of the programming interface are to be evaluated using the additional attribute attached to the programming interface.

10. The computer program product of claim 9, wherein computer-executable instructions that, when executed, cause the computer system to determine that a default visibility into the programming interface is to be altered comprise computer-executable instructions that, when executed, cause the computer system to determine that a default visibility into an application programming interface (API) is to be altered; and
wherein computer-executable instructions that, when executed, cause the computer system to override the default visibility into the programming interface by attaching an additional attribute to the programming interface comprise computer-executable instructions that, when executed, cause the computer system to override the default visibility into the application programming interface (API) by attaching an additional attribute to the application programming interface (API).

11. The computer program product of claim 10, wherein computer-executable instructions that, when executed, cause the computer system to override the default visibility into the programming interface by attaching an additional attribute to the application programming interface (API) comprise computer-executable instructions that, when executed, cause the computer system to reduce the visibility into a public application programming interface (API) by attaching the additional attribute to the public application programming interface (API).

12. The computer program product of claim 10, wherein computer-executable instructions that, when executed, cause the computer system to override the default visibility into the programming interface by attaching an additional attribute to the application programming interface (API) comprise computer-executable instructions that, when executed, cause the computer system to increase the visibility into a non-public application programming interface (API) by attaching the additional attribute to the public application programming interface (API).

13. At a computer system, the computer system including a runtime environment that can request dynamic access to program interfaces, the runtime environment providing dynamic access requests with a default visibility into program interfaces based on program interface type, a method providing a consumer with specified visibility into a programming interface, the method comprising:
during execution of executable code in the runtime environment:
receiving a dynamic call to execute a portion of the executable code, the portion of the executable code derived from a portion of corresponding application code that refers to a program interface;
accessing a runtime default visibility into the program interface, the runtime default visibility defining runtime access the programming interface;
accessing one or more additional attributes attached to the program interface, that alter the runtime default visibility into the program interface;
determining a calculated visibility into the program interface based on the runtime default visibility and the one or more additional attached attributes; and
providing the dynamic call with access to the program interface in accordance with the calculated visibility.

14. The method of claim 13, wherein the program interface is an application program interface (API).

15. The method of claim 14, wherein accessing one or more additional attributes that alter the runtime default visibility comprises accessing one more additional attributes attached to the application program interface (API) that reduce visibility into the application program interface (API).

16. The method of claim 14, wherein accessing one or more additional attributes that alter the runtime default visibility comprises accessing one or more additional attributes attached to the application program interface (API) that increase visibility into the application program interface (API).

17. The method of claim 13, wherein determining a calculated visibility into the program interface comprises determining a calculated visibility into an application program interface (API) based on an API type for the application program interface (API), at least one of the one or more additional attributes attached to the application program interface (API), and an attribute applied to the portion of application code.

18. The method of claim 13, wherein determining a calculated visibility into the program interface comprises determining a calculated visibility for an application program interface (API) based on an API type for the application program interface (API) and at least one of the one or more additional attributes attached to the application program interface (API), wherein the calculated visibility differs from the runtime default visibility.

19. The method of claim 13, wherein determining a calculated visibility into the program interface comprises determining a calculated visibility that permits the dynamic call to access a private application program interface (API) based at least on the one or more additional attached attributes overriding the runtime default visibility for the private application program interface (API).

20. The method of claim 13, wherein providing the dynamic call with calculated visibility into the programming interface comprises preventing the dynamic call from accessing a public application program interface (API) based on the calculated visibility.

* * * * *